United States Patent Office 3,655,594
Patented Apr. 11, 1972

3,655,594
ACRYLIC RESIN CONTAINING TOUCH-UP FILLER COMPOUND
Joseph J. Medica, St. Petersburg, Kenneth G. Trout, Tampa, and Stanley C. Kyminas, St. Petersburg, Fla., assignors to The Celotex Corporation, Tampa, Fla.
No Drawing. Filed Aug. 13, 1969, Ser. No. 849,864
Int. Cl. C09d 5/34
U.S. Cl. 260—17 R
3 Claims

ABSTRACT OF THE DISCLOSURE

A single application filler compound for touching up gouges in fiberboard products contains about 50% by weight of a water base thermoplastic acrylic copolymer with a low pigment to binder ratio and a high viscosity.

BACKGROUND OF THE INVENTION

(1) Field of the invention

Fiberboard products made of cellulose fibers are widely used as decorative tiles or panels in the residential building market. Such products are generally made by a modified paper-making process on a Fourdrinier or cylinder machine from wood pulp, bagasse, straw or the like. In recent years with the rapid increase in the number of mobile homes, the use of fiberboard tiles and panels has risen rapidly. These fiberboard products are used as ceiling or wall components and are shipped in finished state. They are pre-decorated with a finish paint coat so that the expense of on-site decorating labor is eliminated.

Frequently, because of careless handling in unpacking or in installation or because of accidental gouging while in place, the fiberboards become scratched or gouged and must be touched up or refinished.

(2) Description of the prior art

In the past, it has been conventional to apply a commercial putty or caulk to fill the holes or scratches. The putty is allowed to dry and a commercial coat of touch-up paint is applied to blend in the puttied area with the color and finish of the remainder of the panel. The time involved for this two-step operation makes the restoration very costly. At times the panel must be removed from the mobile home assembly line and set aside, adding to the cost. Aditionally, quite frequently the touched-up area does not match the original color and gloss of the remaining area of the panel. Thus, either the entire exposed surface of the panel must be repainted, or the attractiveness of the panel is diminished so that it is unacceptable.

From the standpoint of the manufacturers and suppliers of the filler, the cost of manufacture of the filler makes it a less desirable product from a commercial standpoint. Conventional putty and caulk has a high total solids content and a higher solids-to-binder ratio so that mixing becomes a problem. Low speed mixers must be used so that the time consumed in manufacture is greater. Furthermore, the color and gloss in the dried putty or caulk is difficult to control and predict so that a single-step product cannot be made.

SUMMARY OF THE INVENTION

The invention concerns a single application filler compound for touching up scratches or gouges in fiberboard products. The compound comprises a thermoplastic acrylic copolymer with pigments, extenders, thickeners and water.

It is an object of the present invention to provide a novel filler compound which will fill scatches and gouges in fiberboard with one application.

It is another object of the present invention to provide a novel filler compound whose final color and gloss can be matched to a predetermined standard.

It is yet another object of the present invention to provide a novel filler compound whose performance exceeds that of conventional fillers.

It is still another object of the present invention to provide a new filler compound which can be made in less time than conventional fillers.

DESCRIPTION OF THE PREFERRED EMBODIMENT

The compound of the invention comprises a water-base thermoplastic, acrylic copolymer emulsion binder, such as Rhoplex AC-490, manufactured by Rohm & Haas Company, which is flexible in its film forming characteristics to prevent the compound from cracking upon drying. The specific acrylic emulsion binder Rhoplex AC-490 is fully described and claimed in U.S. Pat. No. 3,356,627 filed on June 17, 1963 and issued on Dec. 5, 1967 to Joseph David Scott. This patent is entitled "Aqueous Blends of Two Water-Insoluble Polymers, One of Which Has 1 to 15% of a Monomer Containing an Alcoholic Hydroxyl, Amino, Amido or Ureido Group."

The solids content of such an acrylic emulsion binder is generally about 45%, as is known in this art.

The patent discloses an invention which is concerned with aqueous dispersions of addition polymers which are adapted for use as coating and impregnating compositions and which are characterized by outstanding properties including improved adhesion to various substrates, improved penetration of and/or adhesion to porous substrates.

The patent discloses the modification of aqueous addition polymer dispersions, generally obtained most conveniently by direct emulsion polymerization. The most important of these dispersions used in making water-based paints are polymers included homopolymers and copolymers of: (1) vinyl esters of an aliphatic acid having 1–18 carbon atoms, especially vinyl acetate: (2) acrylic acid esters and methacrylic acid esters of an alcohol having 1–18 carbon atoms, especially methyl acrylate, ethyl acrylate, butyl acrylate, 2-ethylhexyl acrylate, methyl methacrylate, ethyl methylacrylate and butyl methacrylate: (3) mono- and di-ethylenically unsaturated hydrocarbons such as ethylene, isobutylene, styrene, and aliphatic dienes, such as butadiene, isoprene, and chloroprene.

The invention disclosed by the patent is described by reciting numerous alternate constituents and examples of formulas of these constituents.

Claim 1 of the patent reads as follows:

1. A composition adapted to form flexible, tough adherent coating and impregnant films comprising an aqueous dispersion of (1) a water-insoluble addition polymer selected from the group consisting of vinyl ester polymers, acrylic ester polymers, and vinylhydrocarbon polymers and (2) a water-insoluble copolymer of copolymerizable monoethylenically unsaturated molecules comprising 1 to 15% by weight of at least one monomer containing a polar group selected from the group consisting of alcoholic hydroxyl, amino, amido, and ureido groups, the polymeric components (1) and (2) being compatible to form an adherent film on a substrate, component (1) being present in predominant proportion relative to components (1) and (2), and the relative amounts of components (1) and (2) being predetermined to provide from 0.005 to 7%, based on the total weight of (1) and (2), of polmerized monomer units containing the aforesaid polar group, the polymer of component (1) having an average particle size of at least 0.03 micron, the polymer of component (2) having an average particle size from 0.003 to 3 microns and the average particle size of component (2) being at least 30% smaller than the average particle size of component (1), the polymers of components (1) and (2) having molecular weights in the range of about 10,000 to 10,000,000, and the $T_1$ value of the polymers being not over 25° C.

The use of an acrylic emulsion binder is essential because the flexibility of most other binders is inadequate upon evaporation of the solvents. Thus, for example, a styrene thermoplastic binder will not work. Other ingredients include a white pigment, such as titanium dioxide. Titanium dioxide has a high opacity and gives the compound the proper hiding qualities and color. The titanium dioxide is used in an amount of about 28% to 30% by weight based on resin solids.

Other extenders and flatting agents such as clays, silicas and talcs are added at up to 120% by weight based on the resin solids. Such extenders provide pigment loading but have lower opacity than primary pigments. These extenders are added to maintain the required ratio of pigment to binder solids to achieve the desired gloss and rheological properties of the compound.

Wet edge agents and freeze-thaw stabilizers such as hexylene-, propylene- or ethylene glycol may be added to give the compound an acceptable working time and protect the compound from freeze damage in shipment. Thickeners such as hydroxyethyl cellulose, carboxy methyl cellulose, sodium alginates and base-soluble acrylic latexes are required to provide a high viscosity for proper shear during pigment dispersion, and for final adjustment of product viscosity and thixotropy. Dispersants such as sodium hexametaphosphate and sodium salts of polymeric carboxylic acids are required for proper pigment dispersion. Wetting agents such as alkyl sodium sulfosuccinates and alkyl polyethoxy ethanols may be used to permit proper surface wetting when the compound is applied to glossy or water repellent surfaces. Without proper wetting agents the compound may be repelled from a glossy or greasy surface, hindering adhesion. Shading pastes in small quantities may be added to achieve final color tone, and preservatives such as sodium pentachlorophenol and sodium o-phenylphenol may be added to extend the shelf life and lend microbial resistance to the compound.

The following table sets forth the preferred ingredients and their amounts:

Formulation limits (based on total weight):

| | Percent |
|---|---|
| Acrylic resin emulsion binder | 45–51 |
| Titanium dioxide | 6–7 |
| Extenders, flatting agents | 25–28 |
| Water | 15–17 |
| Freeze-thaw stabilizer, wet-edge agent | 8–10 |
| Thickeners | 2.5–3.0 |
| Dispersants | 0.6–0.8 |
| Defoamers | 0.3–0.5 |
| Wetting agents | 0.1–0.3 |
| Preservatives | 0.05–0.1 |
| Shading pastes | 0.01–0.05 |
| Total solids content | 50–52 |

The preferred formulation comprises the above ingredients in amounts equal to the average of the percentages given.

The viscosity of the novel touch-up filler as measured on a Brookfield viscosimeter with a No. 6 spindle at 20 r.p.m. and 70° F. is in the range of 28,000±5% centipoises.

This compound differs from a conventional putty or caulk due to its relatively low overall solids content of 50–52%, compared to 80–90% total solids for putties and caulks, and due to its low pigment-binder ratio of 1.4/1 compared to 3/1 and higher in putties and caulks.

It also differs from a putty or caulk in that it may be prepared using a high-speed, high-shear mixer such as a disc type disperser, rather than the Ross, pony mixer, ribbon blender or closed sigma-blade mixer normally used, mixing times of 20–30 minutes are adequate for proper preparation rather than 1½ to 2 hours required for low-speed mixing equipment.

This compound differs from a conventional touch-up paint in that its high viscosity and thixotropy allow it to be used as a filler for gouges and deep scratches, thus serving as a putty or caulk, yet its low pigment/binder ratio permits the compound to dry with a uniform gloss, thus serving as a touch-up material in a single step.

In summary a novel touch-up filler compound for refinishing damaged fiberboards comprises about 50% of an acrylic copolymer with pigments and extenders.

We claim:
1. A touch-up filler compound consisting essentially of by total weight:

| | Percent |
|---|---|
| Acrylic resin emulsion binder (45% solids) (aqueous blends of two water-insoluble polymers, one of which has 1 to 15% of a monomer containing an alcoholic hydroxyl, amino, amido, or ureido group) | 45–51 |
| Titanium dioxide | 6–7 |
| Extenders, flatting agents | 25–28 |
| Water | 15–17 |
| Freeze-thaw stabilizer, wet-edge agent | 8–10 |
| Thickeners | 2.5–3.0 |
| Dispersants | 0.6–0.8 |
| Wetting agents | 0.1–0.3 |
| Preservatives | 0.05–0.1 |
| Total solids content | 50–52 | the total amount by weight of said titanium dioxide plus said extenders and flatting agents being 40% greater than the amount by weight of said resin binder solids and in which the amount of titanium dioxide is less than 15% by weight of total solids, said touch-up filler having a viscosity in the range of 28,000±5% centipoises, as measured on a Brookfield viscosimeter with a No. 6 spindle at 20 r.p.m. and 70° F.

2. A touch-up filler compound consisting essentially of by total weight:

| | Percent |
|---|---|
| Acrylic resin emulsion binder (45% solids) | 45–51 |
| Titanium dioxide | 6–7 |
| Extenders, flatting agents | 25–28 |
| Thickeners | 2.5–3.0 |
| Dispersants | 0.6–0.8 |
| Water | 15–17 |
| Freeze-thaw stabilizer, wet-edge agent | 8–10 | the total amount by weight of said titanium dioxide plus said extenders and flatting agents being 40% greater than the amount by weight of said resin binder solids and in which the amount of titanium dioxide is less than 15% by weight of total solids, said touch-up filler having a viscosity in the range of 28,000±5% centipoises, as measured on a Brookfield viscosimeter with a No. 6 spindle at 20 r.p.m. and 70° F.

3. A touch-up filler compound as recited in claim 1 in which said extenders, flatting agents are materials selected from the group consisting of clays, silicas and talcs; said freeze-thaw stabilizer is material selected from the group consisting of hexylene-, propylene- or ethylene glycol; said thickeners are materials selected from the group consisting of hydroxyethyl cellulose, carboxymethyl cellulose, sodium alginates and base soluble acrylic latexes; said dispersants are materials selected from the group consisting of sodium hexametaphosphate and sodium salts of polymeric carboxylic acids; said wetting agents are materials selected from the group consisting of alkyl sodium sulfosuccinates and alkyl polyethoxy ethanols, said preservatives are materials selected from the group consisting of sodium pentachlorophenol and sodium o-phenylphenol.

References Cited

UNITED STATES PATENTS

| | | | |
|---|---|---|---|
| 2,829,067 | 4/1958 | Eastland | 260—17 X |
| 3,239,475 | 3/1966 | Clark | 260—17 |
| 3,324,056 | 6/1967 | Vona et al. | 260—17 |
| 3,483,148 | 12/1969 | Desmarais | 260—17 |

WILLIAM H. SHORT, Primary Examiner

L. M. PHYNES, Assistant Examiner

U.S. Cl. X.R.

260—29.6 H, 29.6 BM, 29.6 HN, 29.6 M, 41 B, 17.4